Patented Feb. 20, 1945

2,369,711

UNITED STATES PATENT OFFICE 2,369,711

MEDICINAL PREPARATION

Rudolph H. Blythe, Llanerch, Pa., assignor to Smith, Kline & French Laboratories, Philadelphia, Pa., a corporation of Pennsylvania No Drawing. Application March 17, 1942, Serial No. 435,043

12 Claims. (Cl. 167—58)

This invention relates to an improvement in medicinal preparation and more particularly to one having a high degree of efficacy.

Broadly speaking, the preparation according to this invention will include as essential ingredients a sulfonamide and a vasoconstrictor.

The preparation according to this invention will be highly effective for the treatment of acute and chronic upper respiratory infections, acute and chronic suppurative sinus disease, otitis media, for the prevention of pharyngitis, laryngitis and pulmonary complication secondary to sinus disease, etc.

The preparation may be made up in form suitable for local administration to the infected area by hypodermic injection, or with use of a catheter, syringe, atomizer, tampon, dropper, or the like.

The preparation in accordance with this invention has the great advantage of enabling effective administration, for example, to the upper respiratory tract, to the sinus, etc., of sulfonamides in solid form, with avoidance of the disadvantageous irritating effect and necrosis of tissue consequent to their administration as a solution of the alkaline salt, as heretofore necessarily used, due to the relative insolubility of the sulfonamides in water.

The preparation will be found to be highly effective due to the fact that the vasoconstrictor will act to shrink tissue and membrane and thus open passages to seats of infection, for example, to the sinus, and permit the sulfonamide, which may be in solid form, to come into direct contact with bacteria, which otherwise might be hidden or in an inaccessible region behind swollen membrane.

The preparation further will be advantageous due to the fact that certain of the vasoconstrictors, and salts of certain vasoconstrictors, as derivatives of phenethylamine, have been found to be compatible with the sulfonamides as compared with incompatibility with the alkali salts thereof.

The preparation may include any suitable known vasoconstrictor which will act to shrink the nasal mucosa. By way of example, but without limitation, the vasoconstrictor may comprise cocaine, 1-phenyl-2-aminopropane, 1-phenyl-2-methylaminopropane, 1-(p - methoxyphenyl)-2-aminopropane, 1-(p - hydroxyphenyl)-2-aminopropane, 1-(p-hydroxyphenyl)-2-methylamino-1-ethanol, laevo-1-(m-hydroxyphenyl)-2-methylamino - 1 - ethanol, 1-(p - hydroxyphenyl)-2-methylamino propane, 1-(p-hydroxyphenyl)-2-methylamino - 1 - propanol, 1-(m,p-dihydroxyphenyl)-2-amino-1-propanol, laevo-1-(m,p - dihydroxyphenyl)-2-methylamino - 1 - ethanol, 1-(m,p - dihydroxyphenyl)-2-methylamino-1-propanol, 1-phenyl-2-amino-1-propanol, 1-phenyl-2-methylamino-1-propanol, 1-(p-methyl phenyl) - 2 - aminopropane, 1-(p-hydroxyphenyl)-2-amino-1-propanol, organic or inorganic salts of the bases mentioned as, for example, hydrochlorides, hydrobromides, sulfates, tartrates, carbonates, gluconates, etc., may comprise the vasoconstrictor. And, as will be appreciated, the vasoconstrictor may variously comprise a mixture of one or more vasoconstrictors.

The sulfonamide may, for example, be sulfanilamide and substituted sulfanilamides having an organic mono-substitution and a free hydrogen on the $N_1$ nitrogen, and, more specifically, sulfanilamides such as sulfathiazole, sulfadiazine, sulfapyridine, and the like having an organic mono-substitution and a free hydrogen on the $N_1$ nitrogen and having a free p-amino group, or mixtures thereof, and desirably the sulfonamide will be in the form of fine particles of crystalline structure having a maximum dimension of not in excess of about 30 microns and which may be prepared, for example, by effecting crystallization of the sulfonamide from a solution of, for example, its sodium salt, by the addition to the solution of an equivalent amount of acid under conditions of violent agitation.

The preparation will include a sulfonamide and a vasoconstrictor in a mobile vehicle, as water, an oil, a gel, or the like.

The preparation may include, and desirably will include, a suspending agent, as, for example, gelatine, methyl cellulose, tragacanth, or the like, to aid in maintaining the sulfonamide in suspension; and may include other ingredients as, for example, a substance to render the preparation isotonic, as, for example, sodium chloride, dextrose, glycerine, or the like; a buffering mixture, as, for example, a mixture of sodium borate and boric acid, a mixture of disodium monohydrogen phosphate and monosodium dihydrogen phosphate, a mixture of sodium acetate and acetic acid, or the like; a flavoring agent, as, for example, menthol, an essential oil, or the like; or other ingredients as may be desired.

While the proportions of the essential ingredients or of added ingredients is not of the essence of this invention, the sulfonamide will generally be in amount, on the basis of the vehicle, within about the range 1.0%–10.0%; the derivative of phenethylamine will generally be in amount within about the range 0.1%–5.0%; the suspending agent, if included, will generally be in amount within about the range 0.1%–5.0%; and other ingredients, as they may be added, in suitable amount, as required or desired.

By way of general illustration, for example, the preparation may comprise any of the following combinations of a sulfonamide base and a vasoconstrictor:

1-phenyl-2-aminopropane and sulfapyridine.
Laevo 1-(m,p-dihydroxyphenyl)-2-methylamino-1-ethanol hydrochloride and sulfathiazole.
1-(p-hydroxyphenyl) - 2 - aminopropane hydrobromide and sulfathiazole.
1-(p-hydroxyphenyl) - 2 - methylaminopropane sulfate and sulfadiazine.

As more specifically illustrative of a preparation according to this invention, for example, a highly effective preparation may be made up on the following formula:

|  | Per cent |
|---|---|
| 1-(p-hydroxyphenyl)-2-aminopropane hydrobromide | [1]1.0 |
| Sulfathiazole | [2]5.0 |
| Gelatine | 0.1 |
| Sodium chloride | 0.45 |
| Sodium borate | 0.002 |
| Boric acid | 0.298 |
| Eucalyptol | 0.05 |

[1] Solution in water.
[2] In suspension.

The preparation in the above formula will be of a viscosity such that it may be readily administered by spray or dropper. However, if desired the preparation may be made up as a gel by the addition of 1.0 to 3.0% of tragacanth.

What I claim and desire to protect by Letters Patent is:

1. A nasal and aural preparation comprising a fluid suspension of solid particles of a sulfonamide of the group consisting of sulfanilamide and substituted sulfanilamides having bacteriostatic activity and having an organic monosubstitution and a free hydrogen on the $N_1$ nitrogen in a solution of a vasoconstrictor in a solvent for the vasoconstrictor selected from the group consisting of water and an oil, the sulfanilamide in suspension being in amount not exceeding about 10% based on the solvent for the vasoconstrictor.

2. A nasal and aural preparation comprising a fluid suspension of solid particles of a sulfonamide of the group consisting of sulfanilamide and substituted sulfanilamides having bacteriostatic activity and having an organic monosubstitution and a free hydrogen on the $N_1$ nitrogen in an aqueous solution of a vasoconstrictor.

3. A nasal and aural preparation comprising a fluid suspension of solid particles of a sulfonamide of the group consisting of sulfanilamide and substituted sulfanilamides having bacteriostatic activity and having an organic monosubstitution and a free hydrogen on the $N_1$ nitrogen in a solution of a vasoconstrictor in a solvent for the vasoconstrictor selected from the group consisting of water and an oil.

4. A nasal and aural preparation according to claim 2, characterized by the fact that the vasoconstrictor is 1-(p-hydroxyphenyl)-2-aminopropane hydrobromide and that the sulfonamide is sulfadiazine.

5. A nasal and aural preparation according to claim 2, characterized by the fact that the vasoconstrictor is 1-phenyl-2-methylamino-1-propinol sulfate and that the sulfonamide is sulfathiazole.

6. A nasal and aural preparation according to claim 2, characterized by the fact that the preparation includes a suspending agent for the sulfonamide.

7. A nasal and aural preparation according to claim 2, characterized by the fact that a derivative of phenethylamine comprises the vasoconstrictor.

8. A nasal and aural preparation according to claim 2, characterized by the fact that the sulfonamide is in the form of particles of crystalline structure having a maximum dimension of not in excess of about 30 microns.

9. A nasal and aural preparation according to claim 2, characterized by the fact that the sulfonamide in suspension is in an amount within about the range 1.0%–10.0% based on the water.

10. A nasal and aural preparation according to claim 2, characterized by the fact that the vasoconstrictor is in amount within about the range 0.1%–5.0% based on the water.

11. A nasal and aural preparation according to claim 2, characterized by the fact that the vasoconstrictor is in amount within about the range 0.1%–5.0% based on the water and the sulfonamide is in amount within about the range 1.0%–10.0% based on the water.

12. A nasal and aural preparation according to claim 2, characterized by the fact that the vasoconstrictor is 1-(p-hydroxyphenyl)-2-aminopropane hydrobromide and that the sulfonamide is sulfathiazole.

RUDOLPH H. BLYTHE.